B. W. FLANDERS.
FUMIGATOR.
APPLICATION FILED MAR. 10, 1916.
1,220,969.
Patented Mar. 27, 1917.
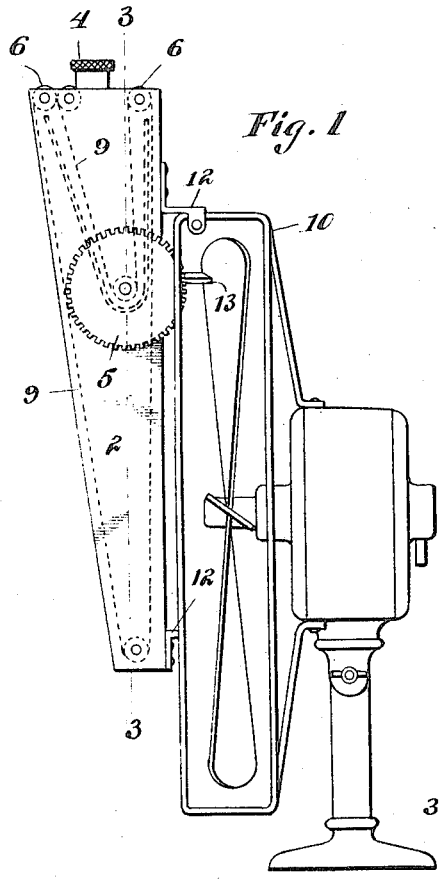
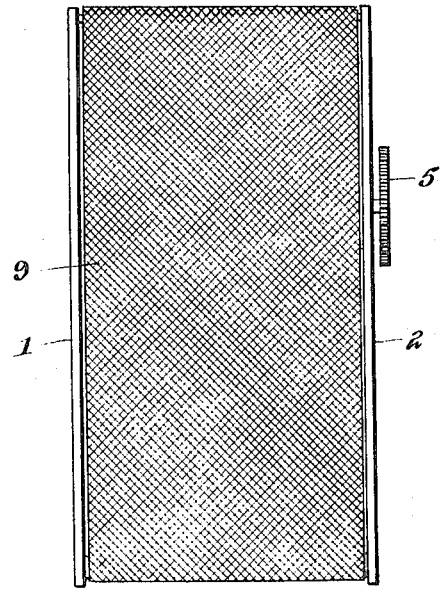
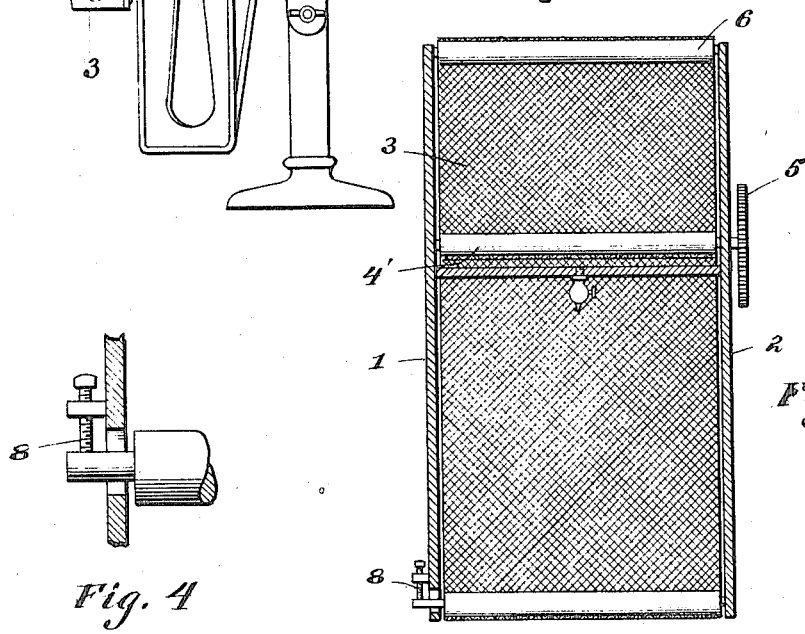
Inventor
B. W. Flanders,
By Victor J. Evans
Attorney
Witnesses
C. P. Rudolph
Wm. R. Smith

UNITED STATES PATENT OFFICE.

BERT W. FLANDERS, OF NEW LONDON, CONNECTICUT, ASSIGNOR OF ONE-HALF TO IRA M. COMSTOCK, OF NEW LONDON, CONNECTICUT.

FUMIGATOR.

1,220,969.

Specification of Letters Patent.   Patented Mar. 27, 1917.

Application filed March 10, 1916.   Serial No. 83,399.

*To all whom it may concern:*

Be it known that I, BERT W. FLANDERS, a citizen of the United States, residing at New London, in the county of New London and State of Connecticut, have invented new and useful Improvements in Fumigators, of which the following is a specification.

This invention relates to fumigators and has for its primary object to construct a fumigator that may be readily attached to a fan.

An object of the invention is to so mount the fumigator upon the fan that the former will be subjected to the air currents from the fan.

Another object of the invention is to construct a fumigator in which the parts are so arranged that the supply of disinfectant will be continuously supplied in the path of travel of the air currents generated by the fan.

A further object of the invention is to construct a fumigator having movable parts actuated by the rotary member of a fan.

With these and other objects in view, the invention consists in the construction, combination and arrangement of parts as will be hereinafter more fully described, illustrated in the accompanying drawings, and pointed out in the claim hereunto appended.

In the drawings:—

Figure 1 is a side elevation of one form of my invention shown attached to a fan.

Fig. 2 is a front elevation thereof.

Fig. 3 is a vertical section on the line 3—3 of Fig. 1.

Fig. 4 is a detail view.

Referring to that form of my invention illustrated in Figs. 1 to 4 inclusive of the drawings, the numerals 1 and 2 designate a pair of end plates. Between the upper end portions of the plates is arranged a disinfectant receiving tank 3, the latter being formed with a filing cap 4. Arranged in the bottom portion of the tank 3 is a roller 4 having one end protruding beyond the side plate 2 so as to make connection with a gear 5 that receives an intermittent motion in a manner to be described later. Mounted adjacent the upper edge of the tank 3 are a series of rollers 6, while arranged between the lower ends of the plates 1 and 2 is a roller 7 mounted for adjustment as illustrated at 8.

Passing around the roller just described is an endless apron 9 made of any suitable material capable of conveying a portion of the disinfectant from the tank 3.

The device is effectively secured to the frame 10 of a fan 11 by means of clips 12 in such a manner that the teeth of the gear 5 may be successively engaged by a finger 13 secured to one of the blades of the rotary member of the fan.

By having the device constructed as set forth, the major portion of the air currents from the fan must pass through the apron 9 and in view of the fact that the apron is heavily loaded with disinfectant the air current will be properly saturated.

From the foregoing description taken in connection with the accompanying drawings, it should be apparent that I provide a device which is admirably adapted for the purpose for which it is intended, that the device is simple, durable and efficient in construction, and that the device may be manufactured and sold at a comparatively low cost.

What I claim is:—

A fumigator attachment for a fan comprising a disinfectant receiving tank and an absorbent material for conveying the disinfectant and supported below the tank in the path of movement of air currents from the fan, means for giving movement to the absorbent material including a gear and a member supported by one blade of the fan adapted to engage said gear for intermittently moving the same and a manual control valve controlling the flow of fluid from the tank to said material.

In testimony whereof I affix my signature in presence of two witnesses.

BERT W. FLANDERS.

Witnesses:
MARION M. MAY,
HERBERT O. CRANDALL.